United States Patent [19]
Krusius et al.

[11] Patent Number: 6,005,649
[45] Date of Patent: Dec. 21, 1999

[54] TILED, FLAT-PANEL MICRODISPLAY ARRAY HAVING VISUALLY IMPERCEPTIBLE SEAMS

[75] Inventors: J. Peter Krusius, Ithaca; Donald P. Seraphim, Vestal, both of N.Y.

[73] Assignee: Rainbow Displays, Inc., Endicott, N.Y.

[21] Appl. No.: 09/120,569

[22] Filed: Jul. 22, 1998

[51] Int. Cl.⁶ .......................... G02F 1/133; G02F 1/1347
[52] U.S. Cl. .................... 349/73; 349/74; 349/20
[58] Field of Search ................... 349/73, 74, 20, 349/21

[56] References Cited

U.S. PATENT DOCUMENTS

| | | | |
|---|---|---|---|
| 5,461,501 | 10/1995 | Sato et al. | 359/59 |
| 5,661,531 | 8/1997 | Greene et al. | 349/73 |
| 5,728,591 | 3/1998 | Takahashi et al. | 437/21 |
| 5,742,373 | 4/1998 | Alvelda | 349/204 |
| 5,796,452 | 8/1998 | Pierson | 349/73 |
| 5,808,710 | 9/1998 | Pierson | 349/73 |
| 5,838,405 | 11/1998 | Izumi et al. | 349/73 |
| 5,847,784 | 12/1998 | Finnila et al. | 349/73 |
| 5,847,785 | 12/1998 | Izumi | 349/73 |
| 5,867,236 | 2/1999 | Babuka et al. | 349/73 |

*Primary Examiner*—William L. Sikes
*Assistant Examiner*—Tarifur R. Chowdhury
*Attorney, Agent, or Firm*—Salzman & Levy

[57] ABSTRACT

This invention describes tiling structures, methods, and circuits for making large flat-panel displays from an array of microdisplays. The inventive displays overcome the intrinsic size limits of monolithic microdisplays and allow the construction of large area, low cost, high brightness, high contrast magnified view or rear projection flat panel displays having visually imperceptible seams and are optically uniform. A structure wherein multiple microdisplay tiles are mounted on a thermally matched common substrate having inherent temperature control features is described. Additional integrated circuits such as CMOS circuits may be embedded either in the back plane of the microdisplay tiles themselves and/or in the common substrate if the common substrate is made from a suitable semiconductor material. These circuits can provide functions such pixel addressing, image control, or even complete microprocessor functions within the flat-panel display assembly itself.

34 Claims, 18 Drawing Sheets

TILED, FLAT-PANEL MICRODISPLAY ARRAY HAVING VISUALLY IMPERCEPTIBLE SEAMS

RELATED APPLICATIONS

This application is related to copending patent applications titled "Tiled Flat Panel Displays," Ser. No. 08/571,208, filed Dec. 12, 1995; and "Method for Assembling a Tiled, Flap-Panel Microdisplay Array" Ser. No. 09/250,486, filed Feb. 15, 1999. This application is also related to U.S. Pat. No. 5,661,531, titled "Tiled, Flat-Panel Display Having Invisible Seams." All three applications are hereby incorporated by reference.

FIELD OF THE INVENTION

This invention relates to electronic flat panel displays and, more particularly, to tiled semiconductor microdisplays assembled into single composite flat-panel displays having visually imperceptible seams.

BACKGROUND OF INVENTION

Microdisplays ($\mu$D) are the most recent addition to the family of flat-panel displays. While $\mu$Ds are based on a number of different techniques to generate or modulate light, all are based on the use of microfabrication technologies to produce a rectangular array of pixels on a semiconductor (usually silicon) back plane. Examples of $\mu$Ds include liquid crystal displays (LCDs), field emission displays (FEDs), and digital micro-mirror displays (DMDs).

Pixels in $\mu$Ds can be fabricated to have pitches in the range of 10 $\mu$m×10 $\mu$m to 20 $\mu$m×20 $\mu$m, which results in display array size of approximately 10.24 mm×7.68 mm having XGA resolution (1024×768 pixels) at 10 $\mu$m pixel pitch.

Control, driver and image processing circuits may be embedded into the back plane. When viewed through a suitable magnifying lens, these $\mu$D pixel arrays can be designed to appear to the human observer as equivalent to a desktop monitor (e.g., a 15" diagonal monitor) when viewed at distances of approximately twice the diagonal dimension. In these direct-view, magnified applications, $\mu$Ds are suitable for use in such applications as portable televisions, compact discs, digital video discs (DVDs), personal digital assistant (PDA) applications and the like.

In contrast, when projected on the back side of a large screen through an optical system and viewed from the front, $\mu$Ds may have the potential to produce images that rival conventional front screen projectors using polycrystalline LCDs. In this projection configuration, $\mu$Ds may be used in applications such as large screen TVs, multi-user (multi-viewer) computers, multi-media, and home theaters.

However, many design problems have heretofore prevented the realization of this potential. For example, small reflective microdisplays generally have a rather low geometric efficiency, which makes high brightness, projected images difficult to achieve. Small microdisplays also force the use of small size arc lamps or special lamps that provide high luminous output at small source size in order to maintain geometric efficiency.

The construction of a typical reflective LCD $\mu$D device is herein described and serves as a starting point for describing tiled $\mu$D assemblies. The tiling structures, fabrication methods, and circuits for other reflective or emissive $\mu$D displays are essentially the same and are therefore not described separately.

The back plane of a typical $\mu$D is formed from a crystalline silicon chip which includes CMOS integrated circuits that have been fabricated using a typical SRAM process as is well known to those skilled in the art. Minimum feature sizes of about 1 $\mu$m or less are typical on such chips. No significant difference in the fabrication process, compared to standard CMOS chips, occurs until the application of the upper levels of metal interconnect. Multi-layer Al/SiO$_2$ metallization is still used, but the topmost metal layer forms a two-dimensional array of rectangular mirrors, each about 10–30 $\mu$m on a side with a gap of about 1 $\mu$m between each pair. These mirror elements serve as the pixels of the $\mu$D, the topmost Al layer being polished to a mirror finish in order to serve as a highly effective optical mirror with a reflectivity generally larger than 80%. The gaps between the mirrors are filled with a dielectric material, typically SiO$_2$, with a low optical reflectivity. Therefore, the mirror array forms the image plane of the microdisplay.

The ratio of the optically active area of each mirror to the entire area of the mirror plus any optically inactive areas, such as gaps, is called the aperture ratio. Typical $\mu$D aperture ratios are on the order of 85%, which is much higher than is possible with direct view transmissive active matrix liquid crystal displays (AMLCDs). The metal layer immediately underneath the mirror surface forms light shields under the gaps that prevent light from reaching the light sensitive CMOS circuitry in the back plane. Each mirror element is connected to a CMOS driver circuit through single or multiple vias that provide the voltage to that particular pixel. The rest of the metal interconnect in/on the back plane is used for conventional addressing (e.g., matrix addressing) of the pixels and for regular circuit functions and services for the CMOS circuitry. The CMOS back plane can also contain some or all of the circuits needed for display addressing (e.g., row and column drivers for matrix addressing), control circuits, and any desired image processing circuits.

Given the CMOS back plane with mirror elements, the $\mu$D is assembled as follows. A passivation layer and an LCD alignment layer are applied to the top of the mirror plane. A seal bead with a small fill port is next dispensed around the pixel array in the periphery using screen-printing or a dedicated dispensing system. Separately, a glass cover plate having on its lower side a conductive transparent electrode film (e.g., indium-tin-oxide (ITO)), and possibly another alignment layer for the LC material, is fabricated. Large area microfabrication techniques may be used to make arrays of cover plates, which may be scribed and broken into appropriate sizes. A common cover plate is placed on the seal, aligned to the CMOS back plane mirror array and then bonded to the seal bead. The display is next filled with a suitable liquid crystal material, such as twisted nematic liquid crystal (TN-LC) or ferroelectric liquid crystal (FLC) material. The fill port is then sealed. This liquid crystal fill may also contain spacer particles that are dispensed throughout the fill, unless spacers have optionally been fabricated on top of the mirror array. Alternatively, the well that is formed by the seal can be filled with liquid crystal before the formation of the seal between the back plane and a common cover plate. A polarizer film may be applied on the top surface of the common cover plate or placed elsewhere in the optical system.

Next, the $\mu$D component is mounted on an interconnect substrate, usually flex, and connections are made from the edge of the CMOS back plane to the substrate. Finally, the $\mu$D component is suitably encapsulated, thus providing environmental protection. Plastic encapsulation is typically used in consumer products. The resulting $\mu$D modules produced in this manner are compact, lightweight, and relatively inexpensive.

The optical systems for use with μDs provides three separate functions: (a) providing light, (b) forming color, and (c) magnifying the image to the desired size. There are several ways to produce color. Most direct view transmissive AMLCDs form color by placing a color triad (e.g., red, green and blue) into each pixel, using white backlight and color filters. This is called the spatial color generation technique. Since this increases the pixel pitch by a factor of three, compared to a monochromatic pixel array, this technique is not preferred in μDs.

The second mechanism used to produce color is to use a separate display unit for each color and then to combine the colors into a single, final image. This so-called three channel approach is the favored technique in commercial, front-projection displays with polysilicon transmissive LCDs. However, in μD applications, this approach may be acceptable only for large, rear projection systems.

In the third method, the mirror array is illuminated sequentially with different colors, one at a time, thus forming the proper color mix as a time average in the human vision system. This is called the field sequential approach. The sequential field colors can be formed from white light by using a three-color filter on a "color wheel"; or can be formed by three separate color light sources. In some magnified view μDs compound semiconductor solid state light emitting diodes are modulated to produce the field sequential illumination of the mirror array. Field sequential operation requires a pixel response time that is fast enough to resolve the illumination times. For example, at VGA resolution and a frame rate of 60 Hz, the pixel response time should be on the order of 30 μs.

The magnification of the image can be accomplished using refractive or reflective lens assemblies that are well known and widely utilized in standard optical projection systems.

Consider as an illustration the characteristics of a μD manufactured by Displaytech, a Longmont, Colo. based company. The VGA display has 640×480 pixels, a pixel pitch of 13 μm, a pixel spacing of 1 μm, FLC fill, an aperture ratio of 85%, a 85% mirror reflectance, field sequential 15 bit color (32,768 colors), a pixel array size of 8.32 mm×6.24 mm, and a 60 mW power consumption. The full display engine uses field sequential illumination from red, blue, and green LEDs, and a single external polarizer. The pixel response time is on the order of μs, fast enough to support field sequential operation.

Although currently available μDs provide only VGA and SVGA resolutions, much higher resolution devices are anticipated in the future. Table I summarizes characteristics of higher resolution μDs that may be available. Two pixel pitches, 10 and 30 μm, are given in this table, the 10 μm pitch is representative of field sequential color and the 30 μm pitch of spatial color. The rightmost column specifies the magnification factor for rear projector applications with a 40" screen diagonal. Similar numbers can be generated for magnified μD applications.

TABLE I

| Acronym | Resolution | Pixel Pitch | Array Size (mm) | Magnification to 40" Diagonal |
|---|---|---|---|---|
| VGA | 640 × 480 | 30 μm | 19.2 × 14.4 | 41.8x |
|  |  | 10 μm | 6.4 × 4.8 | 125x |
| SVGA | 800 × 600 | 30 μm | 24 × 18 | 33.4x |
|  |  | 10 μm | 8 × 6 | 100.2x |

TABLE I-continued

| Acronym | Resolution | Pixel Pitch | Array Size (mm) | Magnification to 40" Diagonal |
|---|---|---|---|---|
| XGA | 1024 × 768 | 30 μm | 30.1 × 23.0 | 26.6x |
|  |  | 10 μm | 10.2 × 7.7 | 78.5x |
| SXGA | 1280 × 1024 | 30 μm | 38.4 × 30.7 | 20.9x |
|  |  | 10 μm | 12.8 × 10.2 | 62.6x |
| UXGA | 1600 × 1200 | 30 μm | 48 × 36 | 16.7x |
|  |  | 10 μm | 16 × 12 | 50.1x |
| TBA | 1800 × 1440 | 30 μm | 54 × 43.2 | 14.8x |
|  |  | 10 μm | 18 × 14.4 | 44.5x |

It is therefore an object of the invention to provide a tiled, flat-panel display composed of microdisplays.

It is a further object of the invention to provide a tiled, flat-panel display composed of microdisplays and having visually imperceptible seams therebetween.

It is an additional object of the invention to provide a tiled, flat-panel μD display having the μD tiles attached to a common substrate.

It is another object of the invention to provide a tiled, flat-panel μD display having a semiconductor common substrate.

It is a still further object of the invention to embed control circuity in either the semiconductor back plane of the μDs or in the semiconductor common substrate, or both.

It is an additional object of the invention to provide a common substrate which is thermally and mechanically matched to the thermal and mechanical characteristics of the individual μD tiles.

It is yet another object of the invention to provide cooling structures as part of the tiled, flat-panel μD structure to maintain the operating temperature of the display.

It is a still further object of the invention to provide heat-generating means in the display which, when coupled to appropriate temperature sensors and control circuitry, can dynamically maintain an essentially fixed temperature in the tiled, flat-panel μD assembly.

SUMMARY OF THE INVENTION

The present invention is a large microdisplay in which multiple μD components (tiles) are assembled together such that the resulting composite display appears to the observer as a single, monolithic display with no visually perceptible seams, discontinuities, or non-uniformities. The objective is to overcome the limits of chip size, geometric efficiency, resolution, contrast, yield, and back plane technology inherent in monolithically fabricated microdisplays. Lower magnification simplifies projection or eyepiece optics and reduces aberrations and chromatic lens distortions.

The display tiles may be arranged into a regular, two-dimensional array such that all tiles have at least one exposed external edge and one to three internal edges, thus allowing the connections to each display tile to be made at one or more exposed external edges. This allows 1×2, 2×1, 2×2, 2×n and n×2 tile arrays.

The tiles can be fabricated on silicon CMOS wafers using the same microfabrication techniques that are used for monolithic μDs. Tiles may also come from different fabrication lines or chip technologies. The internal edges are fabricated using lithographic pattern definition and special die separation techniques to a high precision on the order of 1 μm or less. The required space for the internal seams is provided by a special layout of the mirrors on the μD tiles. The thickness and planarity of the tiles is controlled using chemical-mechanical polishing (CMP). The tiles are then assembled into a precise n×m array on a thermally matched substrate, the seams between the tiles are filled with a suitable sealant and, optionally, spacers may be provided. The fabrication of the composite tiled μD then follows the conventional process used for making monolithic μDs.

The optical magnification and projection system for the composite μD can be designed and fabricated in the same fashion as that for conventional monolithic μDs, except for the fact that the field size can be n×m times larger than a single μD. These composite μD arrays provide a larger viewable area for magnified displays, thus increasing the number of pixels and the achievable resolution, enhancing viewing angles, and reducing eye strain. Similarly, tiled projection μDs can provide larger pixel counts, higher resolutions, larger image sizes at the same total magnification, better optical efficiency, and higher contrast for the same viewable image size.

BRIEF DESCRIPTION OF THE DRAWINGS

A complete understanding of the present invention may be obtained by reference to the accompanying drawings, when taken in conjunction with the detail description thereof and in which.

DESCRIPTION OF THE PREFERRED EMBODIMENT

The embodiment chosen for purposes of disclosure of tiled microdisplays (μDs) uses reflective liquid crystal (LC) μDs. It should be noted that the same principles can be applied to other types of reflective or emissive microdisplays, such as vacuum field emission, light emissive, and micromirror μDs, which are considered to be within the scope of this invention as well.

Figure 1:
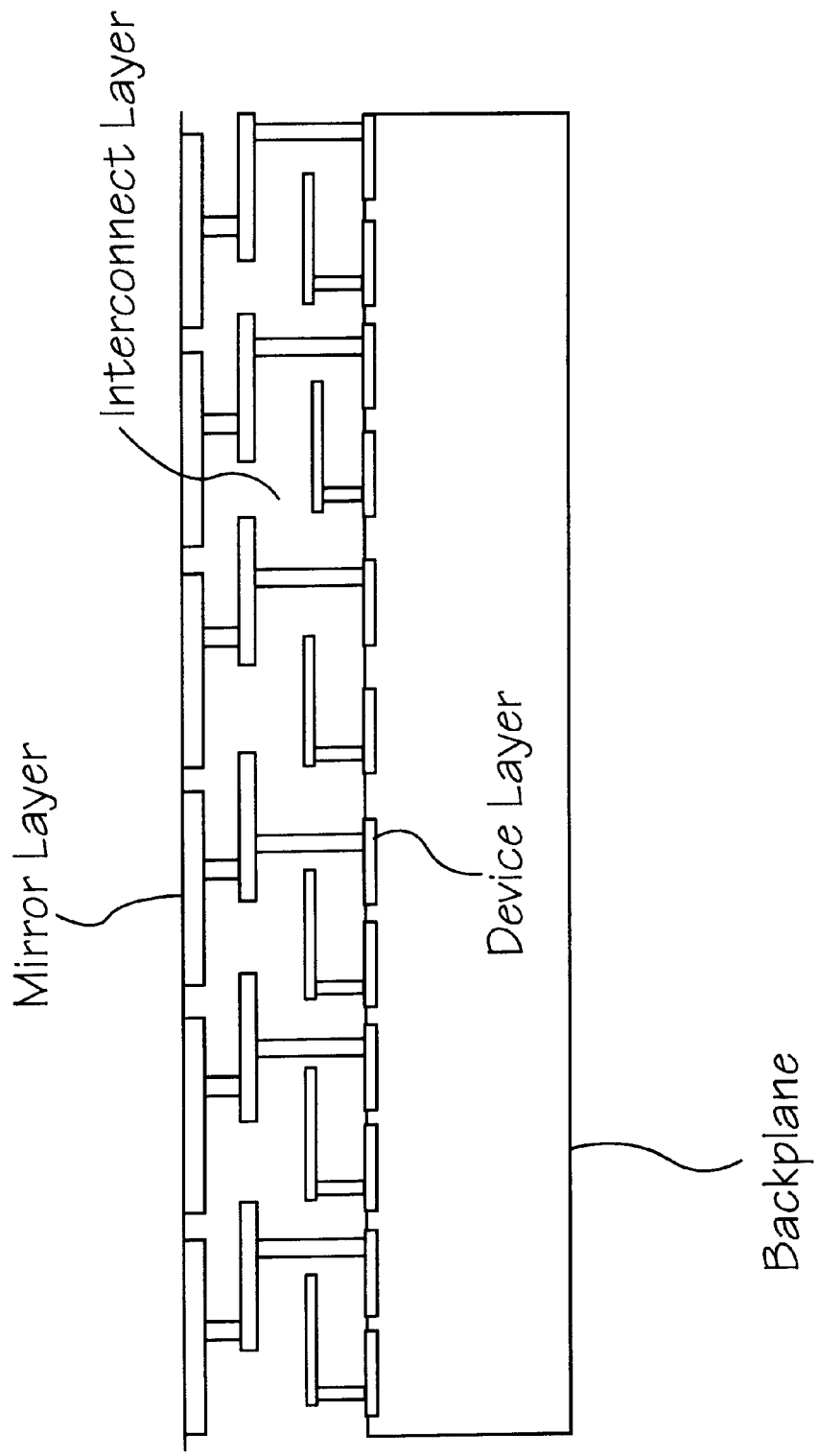
FIG. 1 is a cross-sectional schematic view of a back plane for monolithic microdisplays of the reflective liquid crystal type.
Figure 2:
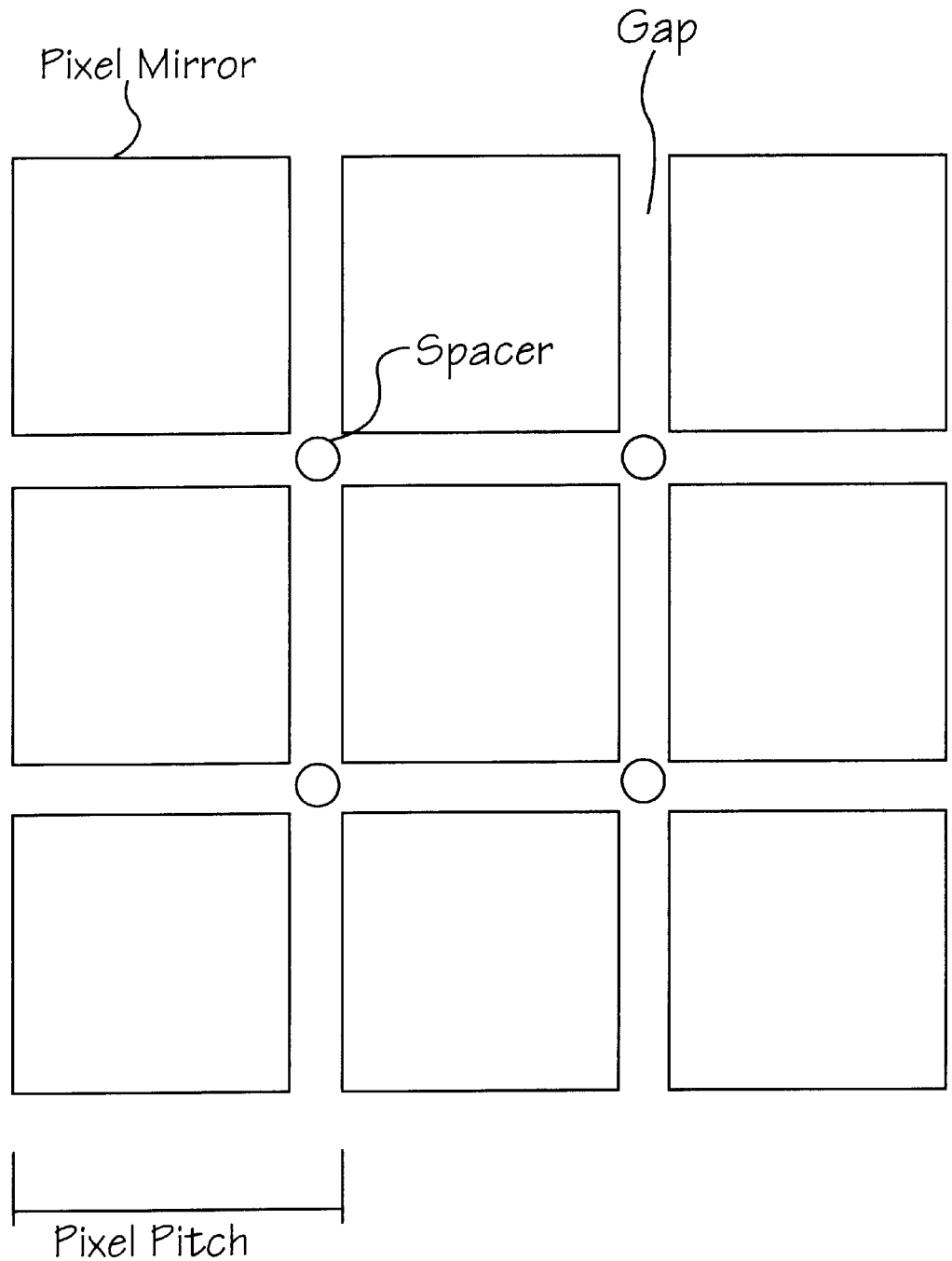
FIG. 2 is a schematic view of an array of optical mirrors on a typical reflective liquid crystal microdisplay.
Figure 3:
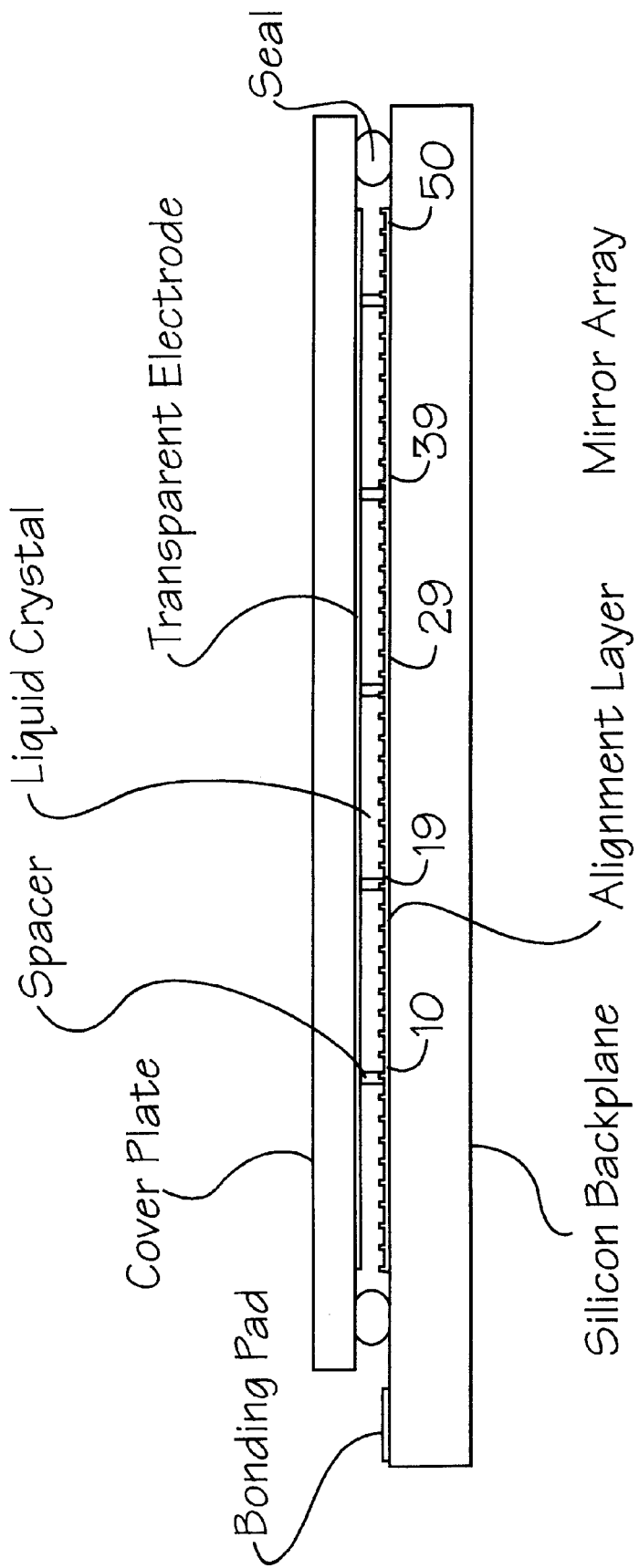
FIG. 3 is cross-sectional schematic view of a complete microdisplay component with back plane, mirror array, liquid crystal fill, spacers, transparent electrode, and common cover plate.

Referring first to FIGS. 1–3, there are shown: a cross-sectional schematic view of a back plane for a prior art monolithic microdisplay of the reflective liquid crystal type; a schematic view of an array of optical mirrors on a typical microdisplay; and a cross-sectional schematic view of a complete microdisplay component with back plane, mirror array, liquid crystal fill, spacers, transparent electrode, and common cover plate, respectively. Each of these FIGS. 1–3 refers to an individual prior art microdisplay (μD) device.

Figure 5:
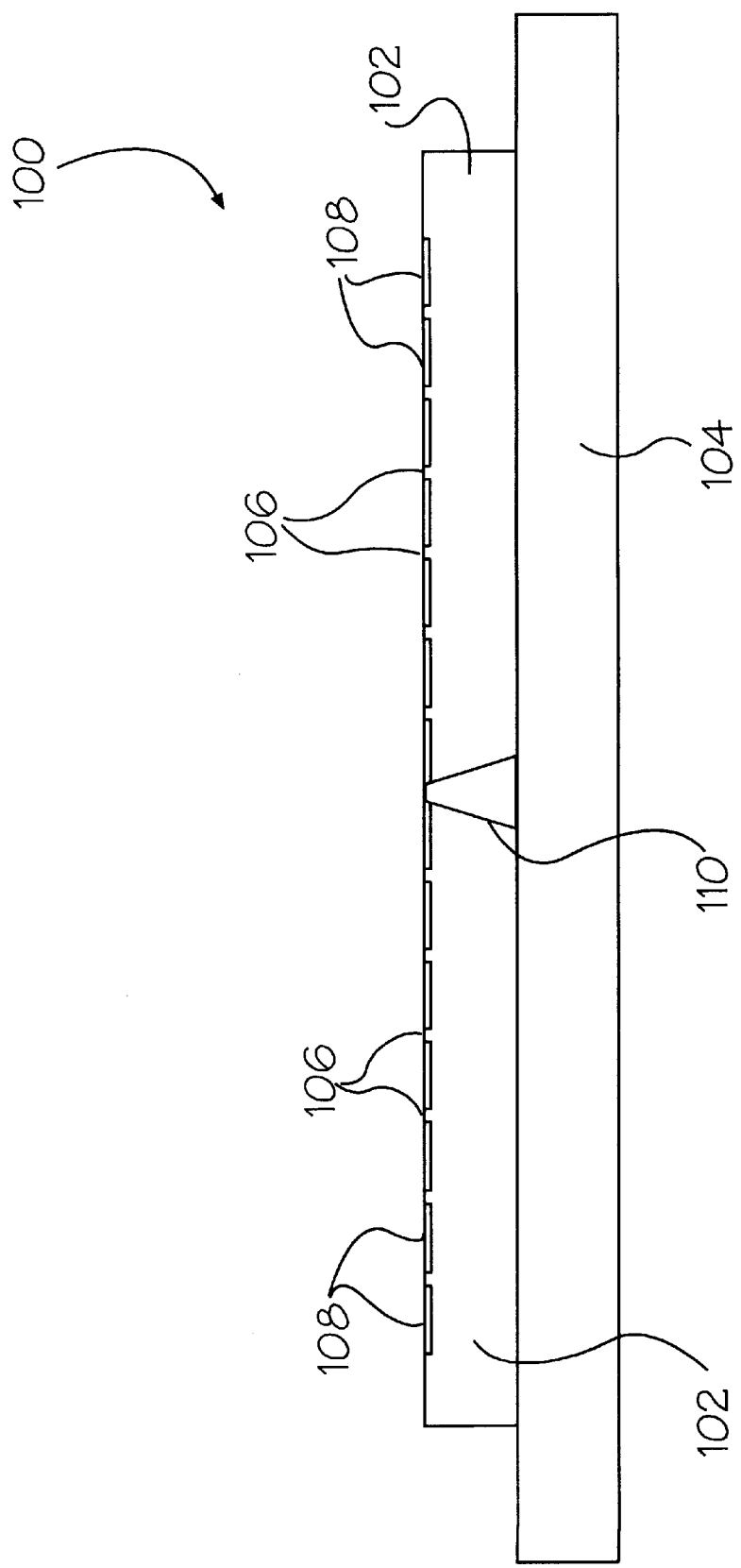
FIG. 5 is a cross-sectional schematic view of structure of the preferred embodiment of tiled microdisplay with tiles, mirror array, seam, and common substrate.

Referring now to FIG. 5, the structure of the back plane of the preferred embodiment of the tiled composite LC μD, is shown generally at reference numeral 100. Tiles 102 are mounted on common substrate 104. The optically inactive areas 106 occur at the gaps between the mirrors 108 on tiles 102 and the seams 110 between tiles 102.

Figure 4:
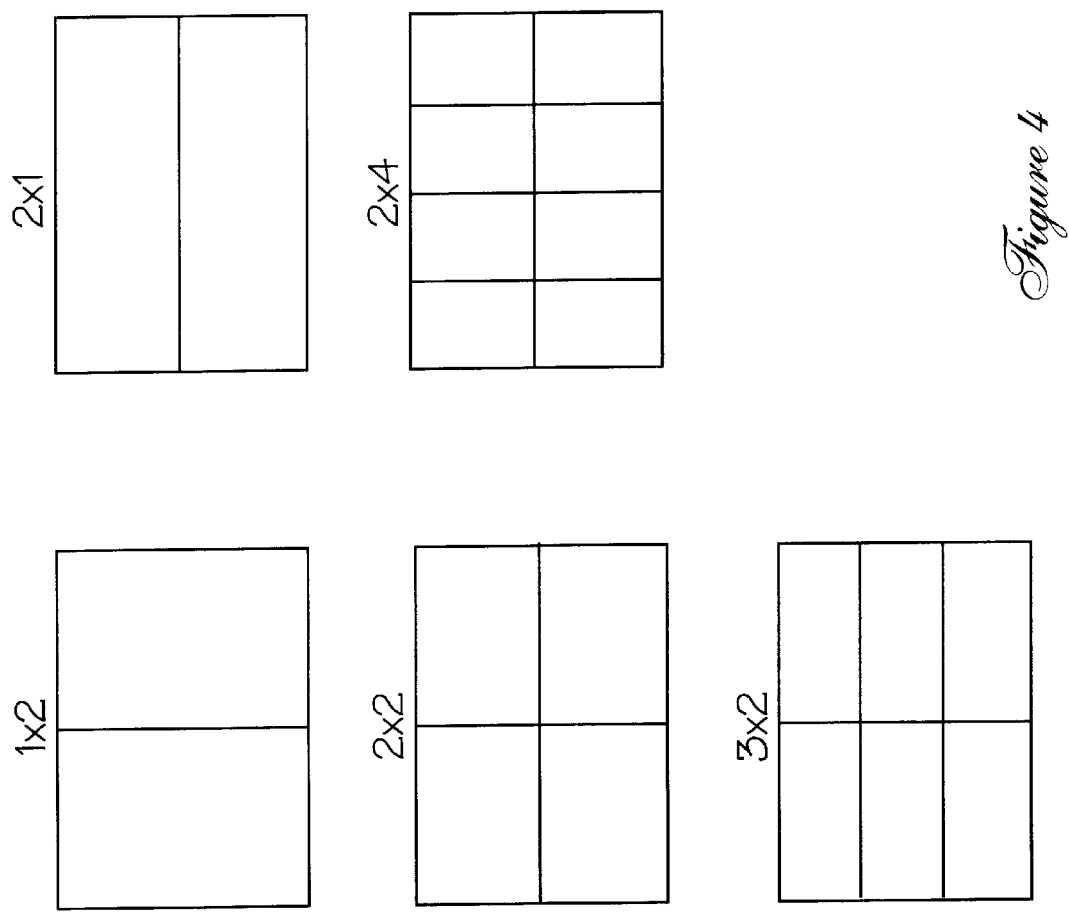
FIG. 4 is a schematic view illustrating five typical microdisplay tiling pattern configurations for edge-accessible microdisplays.

The tiles 102 are arranged into an n×m array (FIG. 4) such that the pixel pitch and pixel alignment on the μD tiles 102 is maintained across the internal seams 110. Therefore, the aperture ratio of the tiled μD 100 is the same as that of a single monolithic μD with the same pixel design. The image plane of the μD contains therefore all mirror elements from all tiles.

In the preferred embodiment, the tile array is permanently attached to a common substrate 104 that is matched to the mechanical and thermal characteristics of the silicon μD tiles 102. This matching is important to maintain the tile-to-tile alignment when the temperature of the composite display 100 changes as a result of the absorbed optical energy or for other reasons. A natural choice for the common substrate 104 is silicon, although other materials, such as certain glass ceramics, also match the thermal/mechanical characteristics of silicon very well. The common substrate 104 may also contain heat transfer means (FIGS. 15–18) in order to control the temperature across the μD tile array 100. The heat transfer means, described in more detail hereinbelow, can consist of an effective thermal conduction path to an external heat sink or can even include embedded micro-cooling channels or heat pipes in order to efficiently transport the dissipated heat away from the μD tiles 102.

The thickness of the µD tiles 102, the attachment layer, and the substrate 104 are chosen and processed such that the top surfaces of the mirrors 108 on the back plane lie in substantially one plane. In other words, the resulting surface is flat to a precision comparable to or smaller than the wavelength of light, typical in the range of 70–4000 nM. Tiles 102 can also be attached to the common substrate 104 using wafer bonding, microfabricated stops, or any other suitable techniques known to those skilled in the art. Other methods for holding the positions of the tiles in a similar configuration are not described in detail here, but are considered encompassed by the present invention as herein described.

Figure 6:
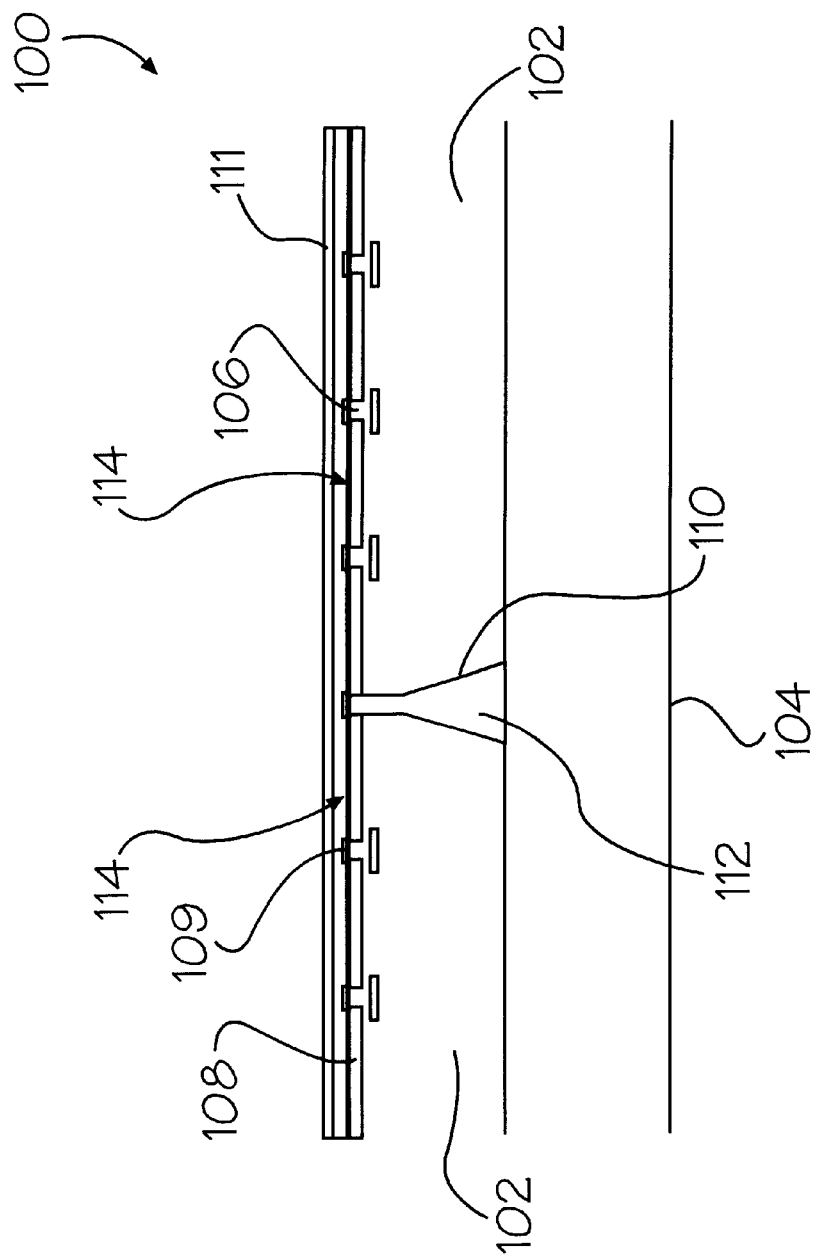
FIG. 6 is a cross-sectional schematic view of the seam region between two microdisplay tiles on a common substrate.

Referring now also to FIG. 6, there is shown a more detailed view of the gap or seam 110 between tiles 102. A suitable material 112 fills seams 110 between adjacent µD tiles 102 flush with the top surface 114 of the mirrors 108. A common passivation layer, that may include microfabricated masking means 109, is deposited on top of the seams 110, covers the entire µD tile array 100. One embodiment of such masking means 109 comprises a patterned, opaque thin film layer that covers all gaps 106 between the mirrors 108 on tiles 102 as well as the seams 110 between tiles 102. This opaque thin-film layer 109 helps achieve a uniform pixel pitch independent of any variations in the tile-to-tile spacing resulting from fabrication tolerances, and a uniform visual appearance of all optically inactive areas (gaps) 106 between the mirrors 108. Such a thin film masking layer 109 can be fabricated using conventional microfabrication techniques, such as thin film deposition, lithography, and etching on top of the composite tile array. A common liquid crystal alignment layer 111, if required for the orientation of the LC molecules, can reside on top of the passivation/masking layer 109 covering all tiles 102.

Figure 8:
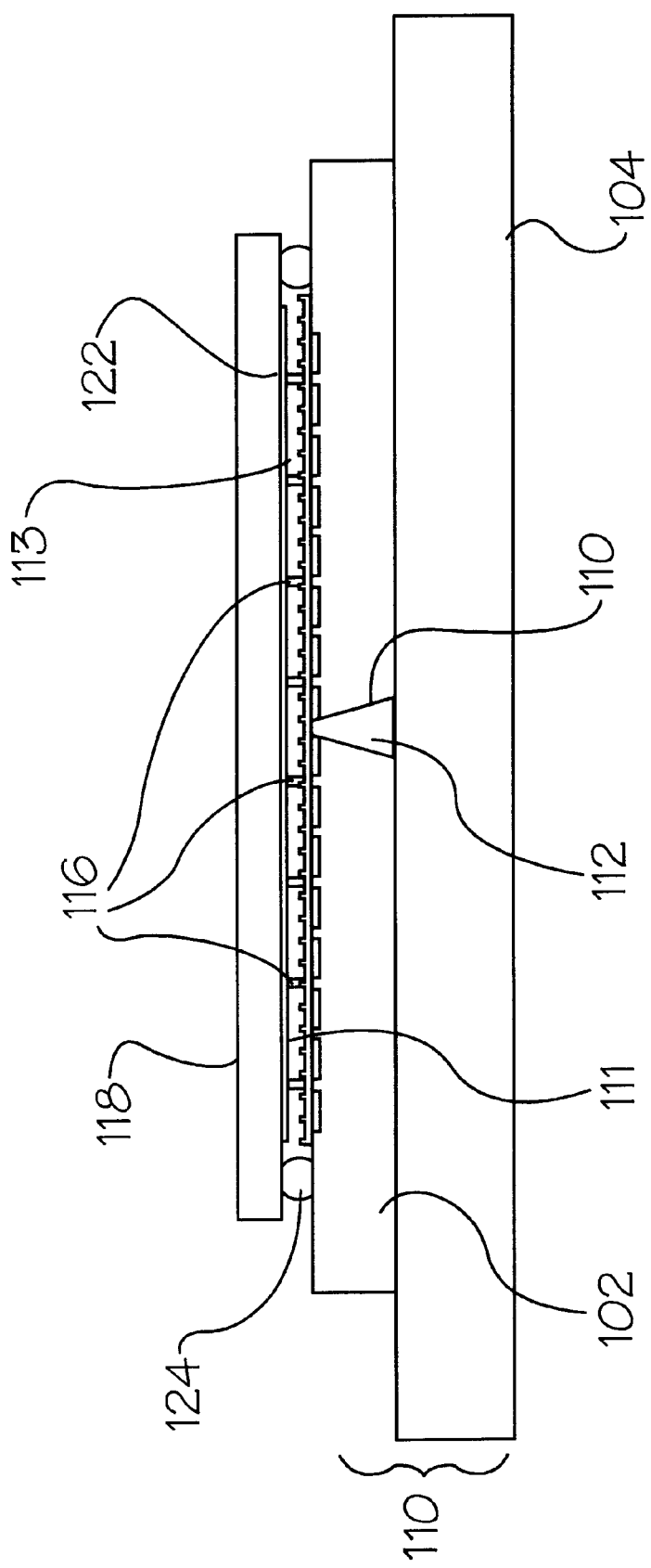
FIG. 8 is a cross-sectional schematic view of a tiled microdisplay of the reflective liquid crystal type showing the substrate, two tiles, one seam, mirror arrays, transparent electrodes, spacers and a common cover plate.

Referring now also to FIG. 8, spacers 116 may be applied on top of the alignment layer 111 to keep the top, cover plate 118 of the µD at a fixed spacing from the back plane. Suitable choices for the spacer material are materials which match the refractive index of the liquid crystal fill 113 and do not interfere with the electric field induced orientation of the liquid crystal molecules. One such suitable material is polyamide. Another stiffer material with a somewhat higher refractive index is for example $SiO_2$. The thickness of the spacers 116 is chosen to be compatible with the optical retardation required for the reflective liquid crystal cell, typically in the range of 2–4 µm. The spacers 116 can be randomly dispensed either separately or with the LC fill 113. Alternatively, they can be fabricated from thin film materials using microfabrication techniques. Posts made of photosensitive organic thin films are one possible choice for the spacers 116. The least optically disturbing placement for the spacers 116 is over the spaces 106 between the mirrors 108, so that the aperture ratio is not reduced, nor do any unwanted refraction effects occur in the spacers 116 themselves.

Figure 7:
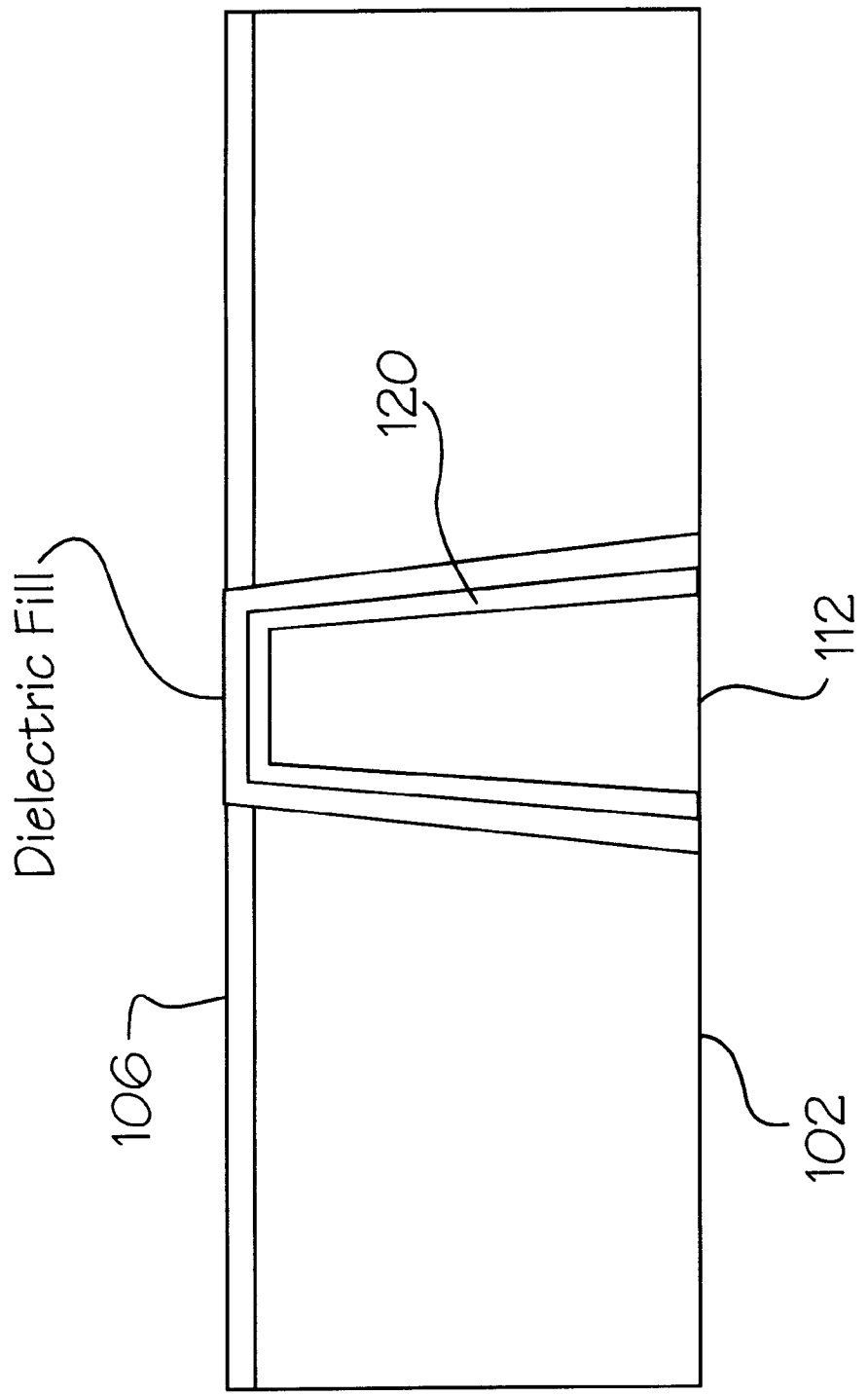
FIG. 7 is cross-sectional schematic view of a microfabricated seam region with embedded light shield and backfill.

Referring now to FIG. 7, an additional layer of light shields 120 can be embedded into the seams 110 between tiles 102 in order to protect the photosensitive CMOS circuitry (not shown) from photo-excited charge carriers. This light shield layer 120 can be formed, for example, from the interconnect metal employed in the CMOS back plane, or from some other suitable thin film that can be deposited and patterned with microfabrication techniques. These light shields 120, which both reflect and absorb light, protect the CMOS integrated circuits from light, and give the seams 110 between the tiles 102 an optical appearance that is similar to the areas between mirrors on the tiles. This seam structure helps give the tiled µD a visually monolithic appearance, and helps keep seams 110 visually imperceptible.

Referring again to FIG. 8, the composite µD has an upper cover plate 118 attached to it. The underside of the cover plate 118 carries a transparent conductive electrode 122 that can provide the common voltage (VCOM), which is required for the operation for LCDs. The conductive electrode 122 may be covered by another transparent alignment layer (not shown) that may be required for the orientation of some LC molecules. The cover plate 118 is attached to the back plane 100 at the edges of the composite µD through a seal 124 that confines the LC fill (not shown) inside the cell, thus covering the entire tile array. The LC can be injected into the cell through a fill port (not shown), for example, as is done in most conventional transmissive and reflective LCDs. The LC may even be applied into the well formed by the seal prior to bonding the cover plate 118. Once the filling step has been completed, the fill port can be permanently sealed.

If required by the optical design of the composite µD, additional optically opaque masking layers (not shown), electrically insulating layers (not shown), or even color filter layers (not shown), may be inserted between the transparent electrode 122 and the cover plate 118. This may not always be desirable, however, because these layers can introduce a windowing effect into the displayed images.

Figure 9:
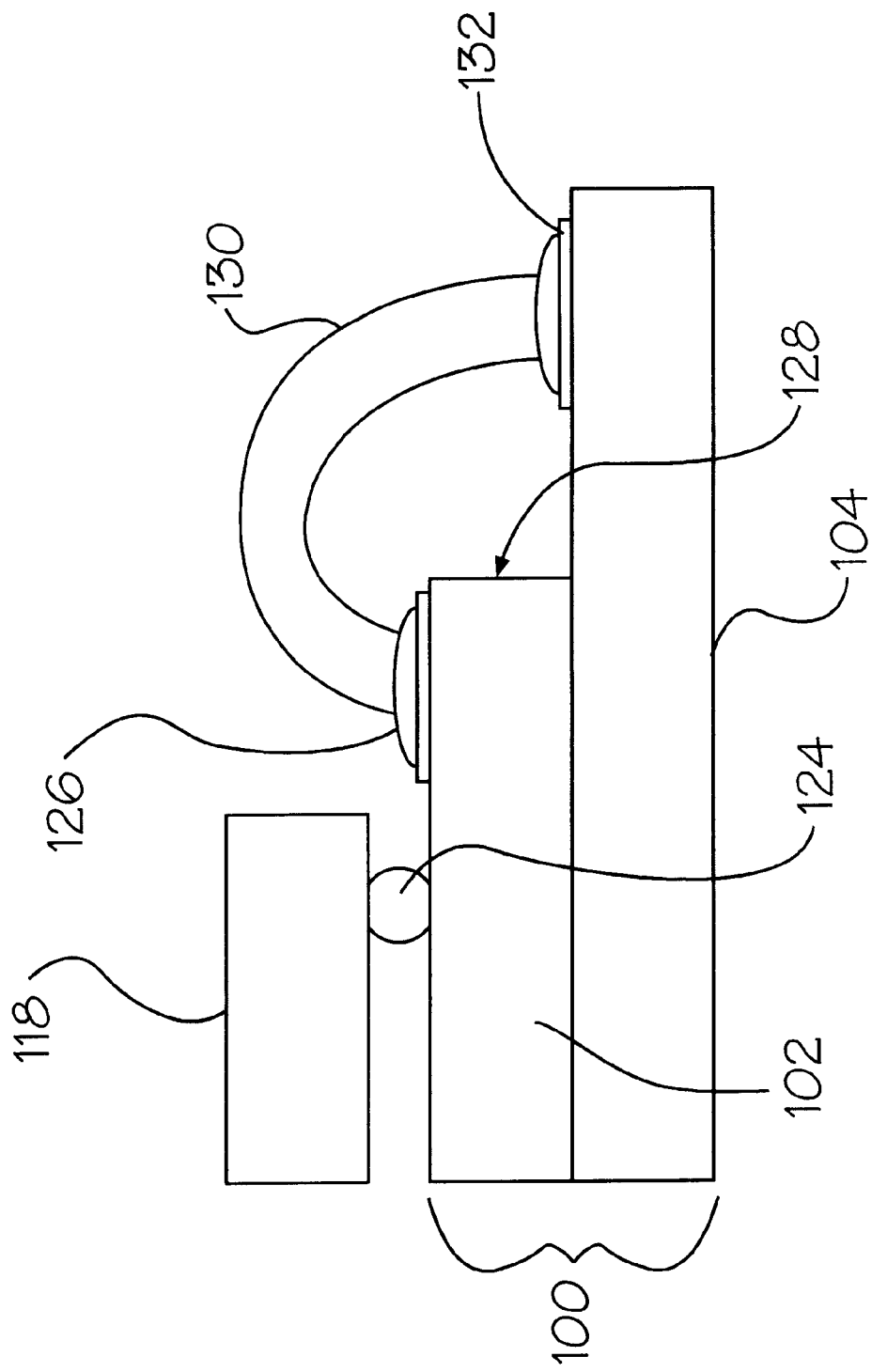
FIG. 9 is a cross-sectional schematic view of peripheral tile bonding based on wire bonding.

Referring now to FIG. 9, there is shown details of one method for making electrical connections between the CMOS back plane 100 and a top electrode or inner pad 126. A wire bond 130 connects inner pad 126 on tile 102 to a connection pad 132 on substrate 104. For edge-accessible tiled µDs, with n×m arrays such that n or m or both are less than or equal to 2, these connections can be made at the outside edge(s) 128 of the tiles 102 using similar connection techniques that are employed for monolithic µDs. For a 2×2 tile array, all tiles 102 can be accessed from two orthogonal edges, thus making X-Y matrix addressing easier. Wire bonding and tape automated bonding (TAB) are among the bonding techniques that can be used. The inner connections have to be made to the tiles, while the outer connections can be made first to the common substrate and from there to the package. Alternatively, the outer connections can be made to an interconnect substrate, such as flex, microvia, or printed wiring board (PWB) (not shown).

The inner connections are best made outside of the sealed mirror array and the signal lines routed from there to the pixels. Since CMOS back planes support multiple metal interconnect levels, this routing poses no problems. Although any pixel addressing schemes can be used, matrix addressing is usually most appropriate. With multiple metal interconnect layers in the back plane, matrix addressing can easily be implemented with connections to a single tile edge.

Figure 10:
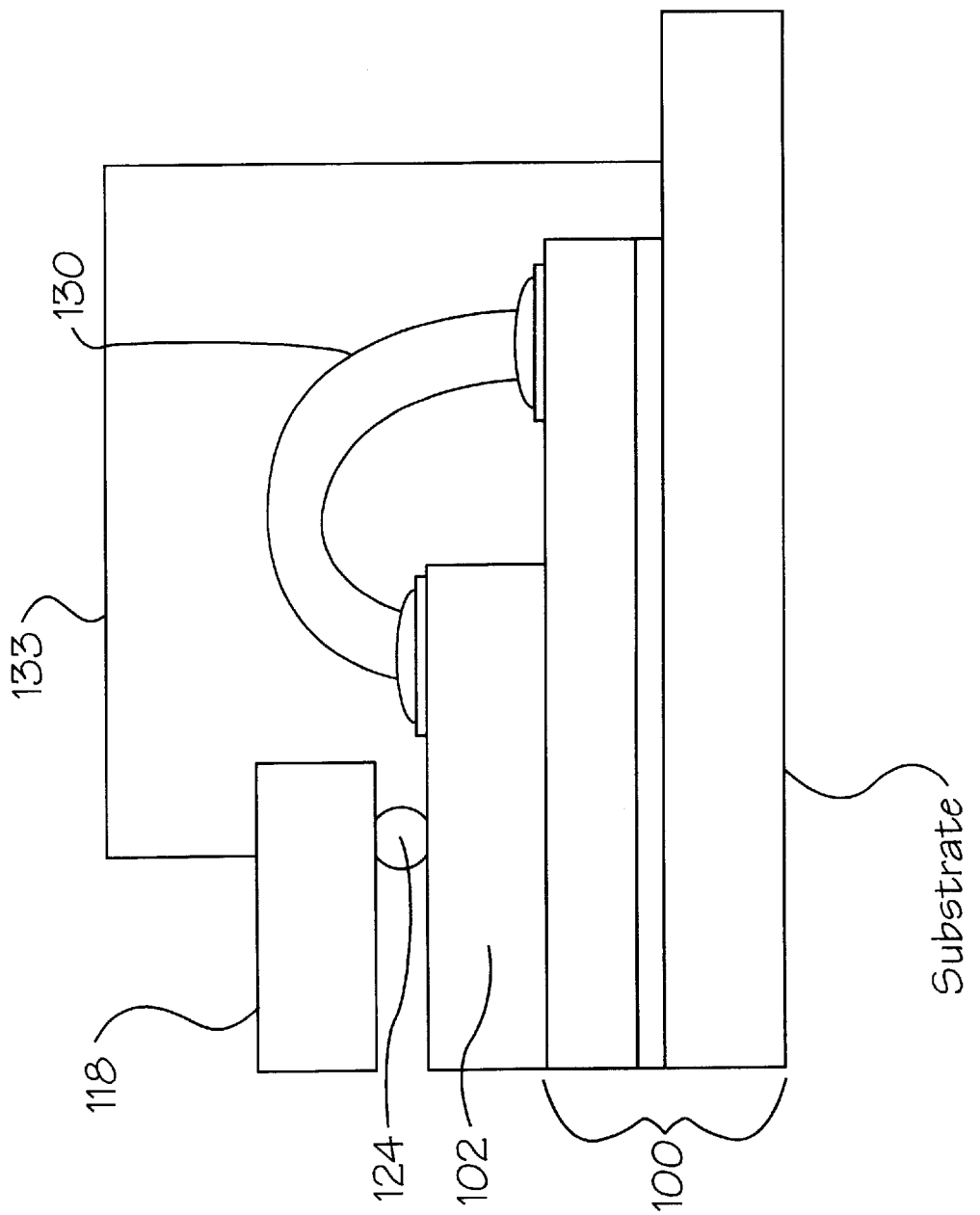
FIG. 10 is a cross-sectional schematic view of peripheral plastic encapsulation applied to the tiled microdisplay (overmolding)

Referring now to FIG. 10, the final step in the fabrication of the tiled µDs is packaging and encapsulation. Here again, similar techniques to those employed in the manufacture of monolithic µDs may be employed. The simplest packaging approach uses overmolding that can easily cover the edges of the tiled µD from the interconnect substrate all the way to the cover or overglass. Overmold material 133 is applied from the edge of cover plate or overglass 118 beyond the interconnection pad on common substrate 104, totally enclosing the wire bond interconnection 130 as well as the edge of tiles 102. This is the same technique as is used in commercial monolithic µDs. If a separate sealed package is used, other electronic packaging techniques, well known to those skilled in the art of electronic packaging, can be adopted with the provision that the package must have a transparent top or lid or alternatively use the common cover plate of the µD as the lid.

The structure of a tiled composite μDs has now been described. Because the optical system for use with the tiled μD, whether of the magnifying or the projection type, is similar to the optical systems required for use with monolithic μDs, they will not be described in detail herein. The only differences arise from the larger size of the tiled μDs, which therefore require larger field sizes to be illuminated, magnified and projected. Suitable optical systems are well known to those skilled in the optical arts.

A major difference between tiled μDs and traditional AMLCD tiled, flat-panel displays is that the tiled μDs may be assembled on a common substrate of semiconductor material. In addition, each individual μD structure is built on a semiconductor wafer capable of carrying additional CMOS or similar circuitry. This permits building VLSI semiconductor structures (usually CMOS) into either the common substrate or into the semiconductor substrates of the individual μDs.

Figure 11:
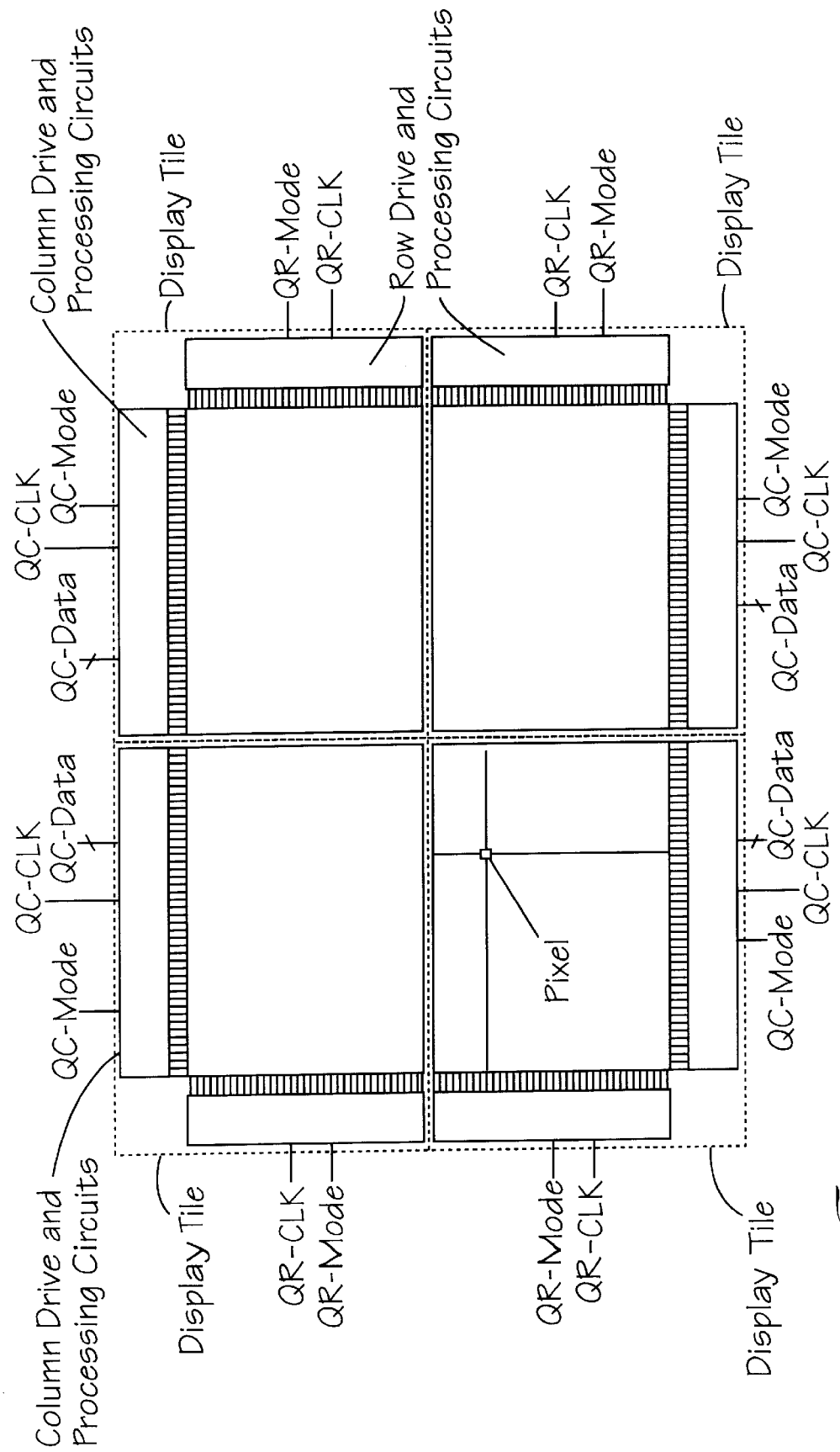
FIG. 11 is a schematic view of a 2×2 μD tile array with row and column driver and video signal processing circuits embedded in the tiles.

Compared to monolithic μDs, tiled μDs require more sophisticated control electronics, as they may be operated in multiple modes and configurations. The requisite circuitry for controlling the tiled display, scanning over the pixels of the tiled display, correcting brightness and color non-uniformities across the display, and performing tiling specific image processing functions can be placed into either the back planes 100 on one or multiple μD tiles 102, or into or onto the common substrate 104, if a compatible material, such as a semiconductor, has been chosen for the substrate. These circuit configurations do not change the assembly of the composite tiled μD display, but rather merge desired circuits into the back planes of the tiles 102 or the common substrate 104. The circuits can be placed either into the periphery of the tiles on the substrate 104, or uniformly distributed over the area of the tiles or the substrate underneath the optically active devices, depending on circuit availability and layout considerations. An embodiment that integrates row and column drivers, signal processing, and control circuits into the tiles is shown in FIG. 11.

Figure 12:
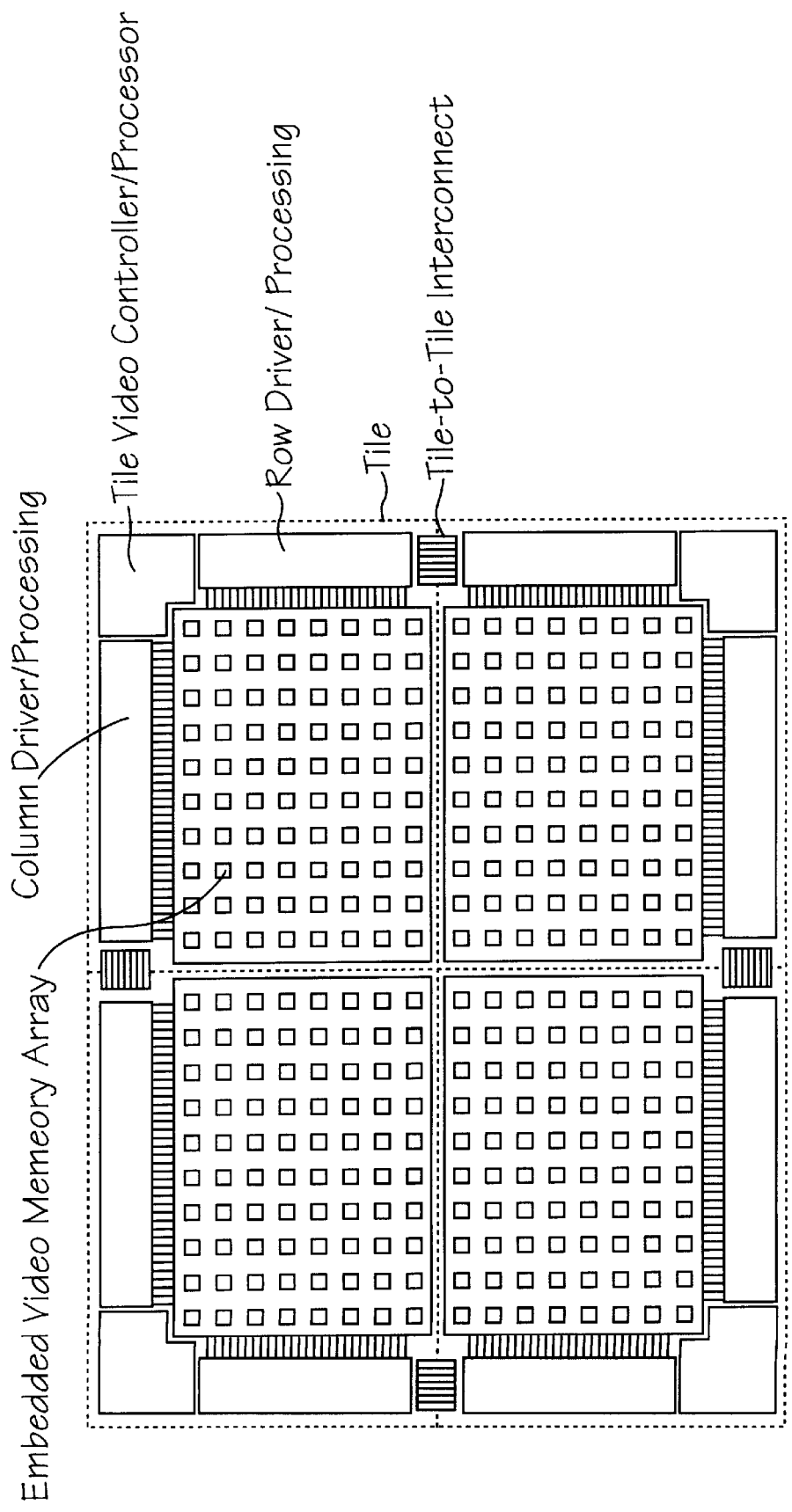
FIG. 12 is a schematic view of a 2×2 μD tile array with row and column driver and video signal processing circuit, tile image controller and video processing circuit, video memory circuits embedded in the tiles, and tile-to-tile connections.
Figure 13:
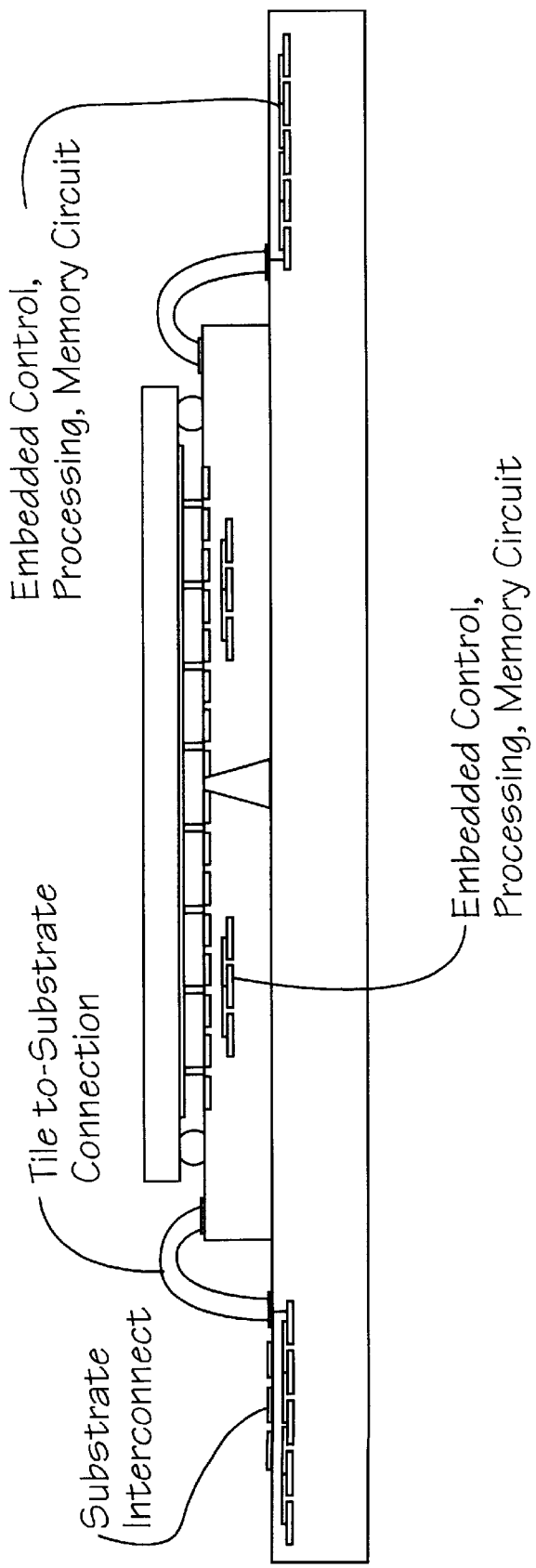
FIG. 13 is a cross-sectional schematic view of μD tile array with display controller, video processing, video storage, and video generation circuits embedded into the common substrate.
Figure 14:
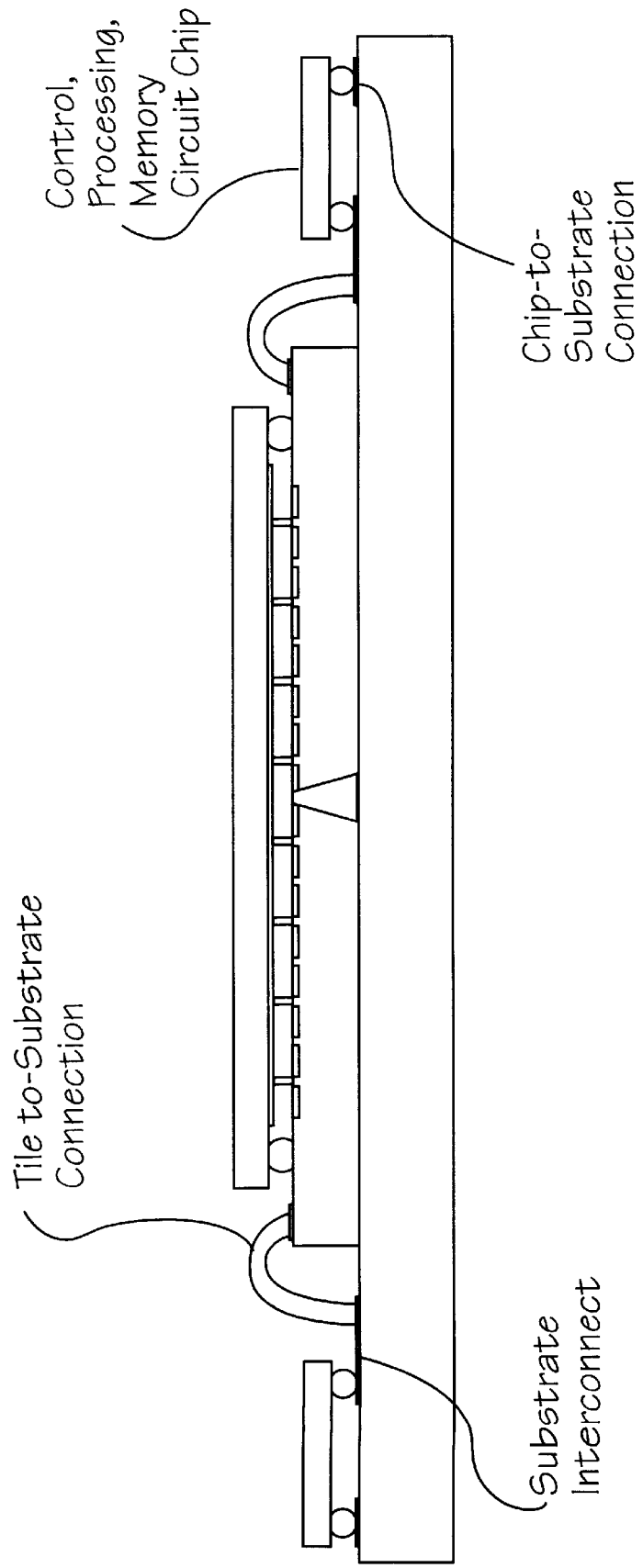
FIG. 14 is a cross-sectional schematic view of a μD tile array with display controller, video processing, video storage, and video generation circuits mounted on top of the common substrate in the periphery of the tiles.

In other embodiments, shown in FIGS. 12–14, these circuits, plus any desired additional display controller and video processing circuits and video memory circuits, are placed into tiles, into the common substrate, or added to the common substrate as hybrid modules. They are attached with any known form of connection technology, such as with wire bonding, tape-automated-bonding, or flip-chip bonding onto the composite back plane. The circuits can select which pixels in the composite mirror array are active and what image or video signals they receive and display. The necessary electrical connections between the tiles can be made on the top surface of the metal interconnect outside of the optically active area using wire bonding or TAB techniques. Alternatively, interconnect lines placed on the common substrate in combination with tile-to-substrate connections can be used. Specific implementations of this embodiment allow the tiled μD to run in a variety of different modes:

single image displayed across the entire pixel array in a single resolution, as occurs on monolithic displays;

single interpolated image shown at higher resolution or lower resolution to produce a tiled μD with a multi-scan capability equivalent to what routinely occurs with CRTs;

scanning a single image in a multitude of ways using interlaced or progressive scanning, while addressing the composite pixel array as one entity or each tile as an individual entity and varying scan directions on a tile-by-tile basis;

displaying one or more different images on the tiles (up to n×m);

correcting for any brightness non-uniformities between the tiles or on the tiles, such that no visually observable abrupt or smooth discontinuities appear in the displayed image across the entire brightness range;

correcting for any color non-uniformities between the tiles such that no visually observable abrupt or smooth color discontinuities remain in the displayed image across the entire color gamut;

providing storage to implement video frame memory either for the composite display as an entity or for each tile separately; or providing image processing circuits that perform operations such as smoothing, filtering, brightness enhancement, motion detection and Moire pattern removal.

It will be obvious to those skilled in the art that the circuitry to accomplish any display function may be included in the μD tile back planes or on a common, semiconductor substrate. The invention is not considered limited to the examples chosen for purposes of disclosure.

In addition, these embedded or attached circuits may contain memory arrays and microprocessors. Such image or video generating circuits could, for example, execute electronic game functions, perform multi-dimensional image rotation functions (2-D, 3-D), produce real time 3-D rendering and shading of surfaces, or execute MPEG-type compression or decompression operations. Complete, programmable microprocessors, such as those used in personal computers and workstations, could be implemented and included in the overall tiled μD structure for executing programs that perform such video processing/graphics functions. Integration of a full PC function with the μD thus becomes possible.

The operating temperature range of monolithic μDs is typically limited to the range from 0 to 40° C. because of the degradation of the optical characteristics of the LC material. Other μDs have similar operating temperature ranges but may be limited by different mechanisms. Operating outside of this range generally reduces the contrast of the displayed images. Therefore, cooling of the μD structure becomes an issue, in particular in high brightness, rear projection applications.

In tiled displays, additional thermal-mechanical issues arise as well. With a thermal expansion coefficient of $3 \times 10^{-6}$ 1/° C. and a temperature rise of 40° C., a 10 mm μD back plane made of silicon expands by 1.2 μm, which is about 12% of the size of a typical pixel. For a monolithic display such a change would be uniform and therefore result only in an image size change rather than in visual non-uniformity or distortion. However, in tiled displays, the tiles may move with respect to each other, thus creating objectionable visually observable seams or discontinuities arising, for example, from a non-uniform pixel pitch or displaced pixels. Consequently, the tiled assembly must be able to expand and contract approximately at the same rate as the tiles themselves.

Another issue arises from the greater total heat dissipation in tiled μDs. This results from the larger area and brighter light sources. Current magnified view monolithic VGA μDs require a brightness only on the order of 171 cd/m² (50 fL) that is generated, for example, by LEDs that dissipate a total of about 70 mW. Such LEDs may have a luminous efficiency as high as 100 lm/W. Such a small amount of energy can easily be dissipated in conventional flex packages. However, today's transmissive polysilicon LCD front projectors produce a luminous flux on the order of 500 lm onto 30–300" diagonal screens. This translates into an illuminance range of 1845–18.45 lx (lm/m$^2$) on the projection screen. If a similar luminous flux impinges on a tiled microdisplay with a mirror reflectivity of 85% in a projection application, about 75 lm is dissipated as heat tiled back plane. Power dissipation can therefore reach values as high as 10 W/tile or a total of 40 W for a 2×2 tiled $\mu$D. This causes a significant increase in the temperature of the back plane, unless the tiled $\mu$D has been properly designed and constructed.

Therefore in the preferred embodiment of the tiled $\mu$D, the tiles are mounted on a thermally matched substrate that has the following desirable characteristics:

a) thermal expansion coefficient matched to that of the back plane in order to keep the pixel pitch on the tiles and across the seams equal, independent of temperature;

b) low thermal resistance from the mirror array on the tiles to the common substrate in order to equalize the temperature between the tiles and the substrate; and c) thermally controllable heat sink attached to the substrate in order to stabilize the temperature to the desired value within the operating range.

Figure 15:
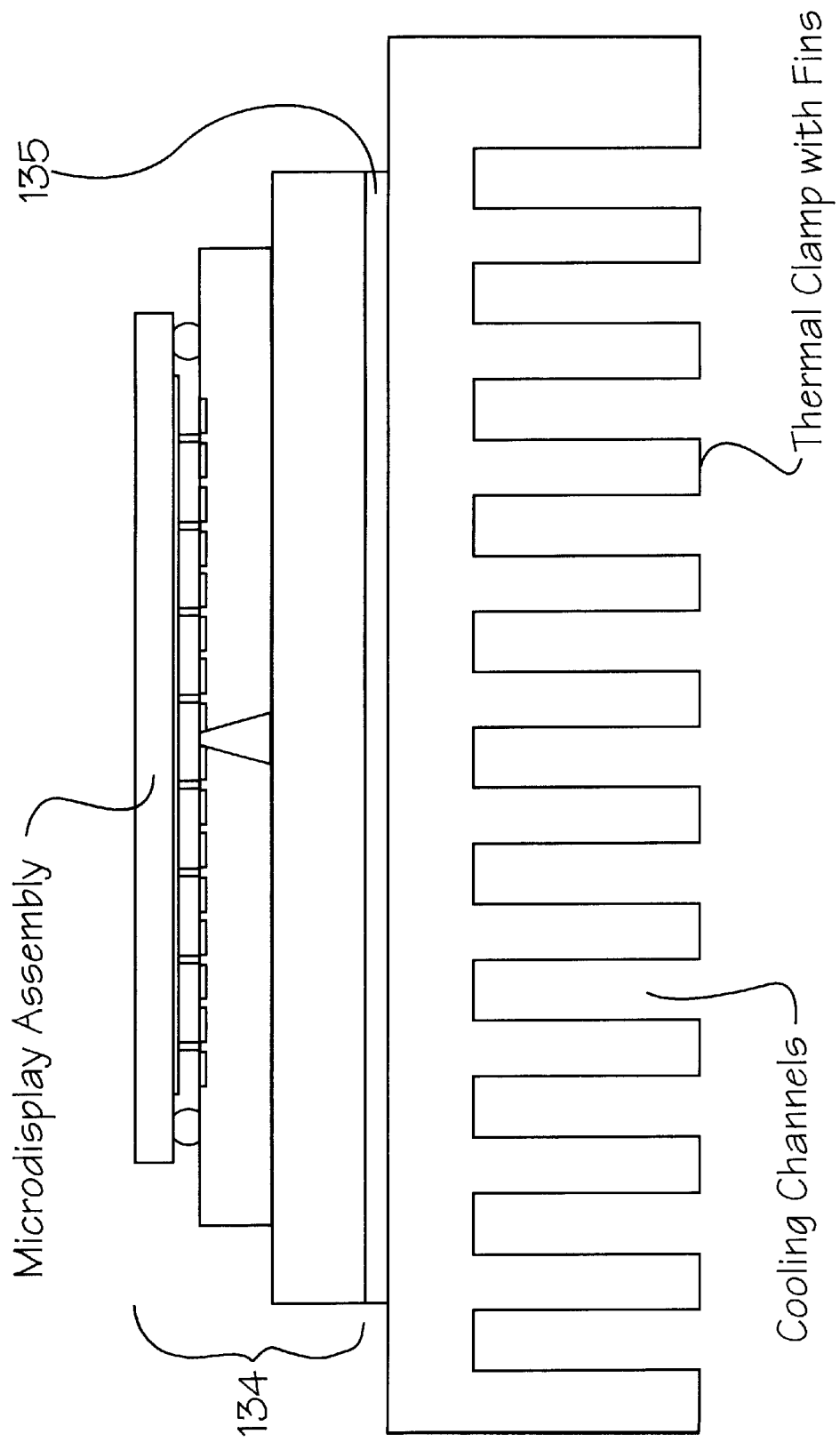
FIG. 15 is a cross-sectional schematic view of a tiled microdisplay array with an attached, finned heat sink.

Assuming, for example, Si tiles, aforementioned requirement (a) can be met with any thermally matched substrate material, including silicon and glass ceramics. A typical structure is shown in FIG. 5. Requirement (b) requires a high heat conductivity in the tiles and the substrate and a chip attach material with high thermal conductivity and low thermal contact resistivity at all interface along the thermal path. This can be accomplished, for example, with Si tiles, a common Si substrate, and low temperature metallic bond material. Requirement (c) can be satisfied with passive and active thermal clamps attached to the tiled $\mu$D assembly such that the latter can freely expand and contract laterally. Referring now to FIG. 15, there is shown such a structure. A large heat sink 130 made of a highly thermally conductive material, such as copper, that is attached to the tiled $\mu$D assembly 134 via a compliant film or thermal grease layer 135 is one embodiment of a passive thermal clamp.

Figure 16:
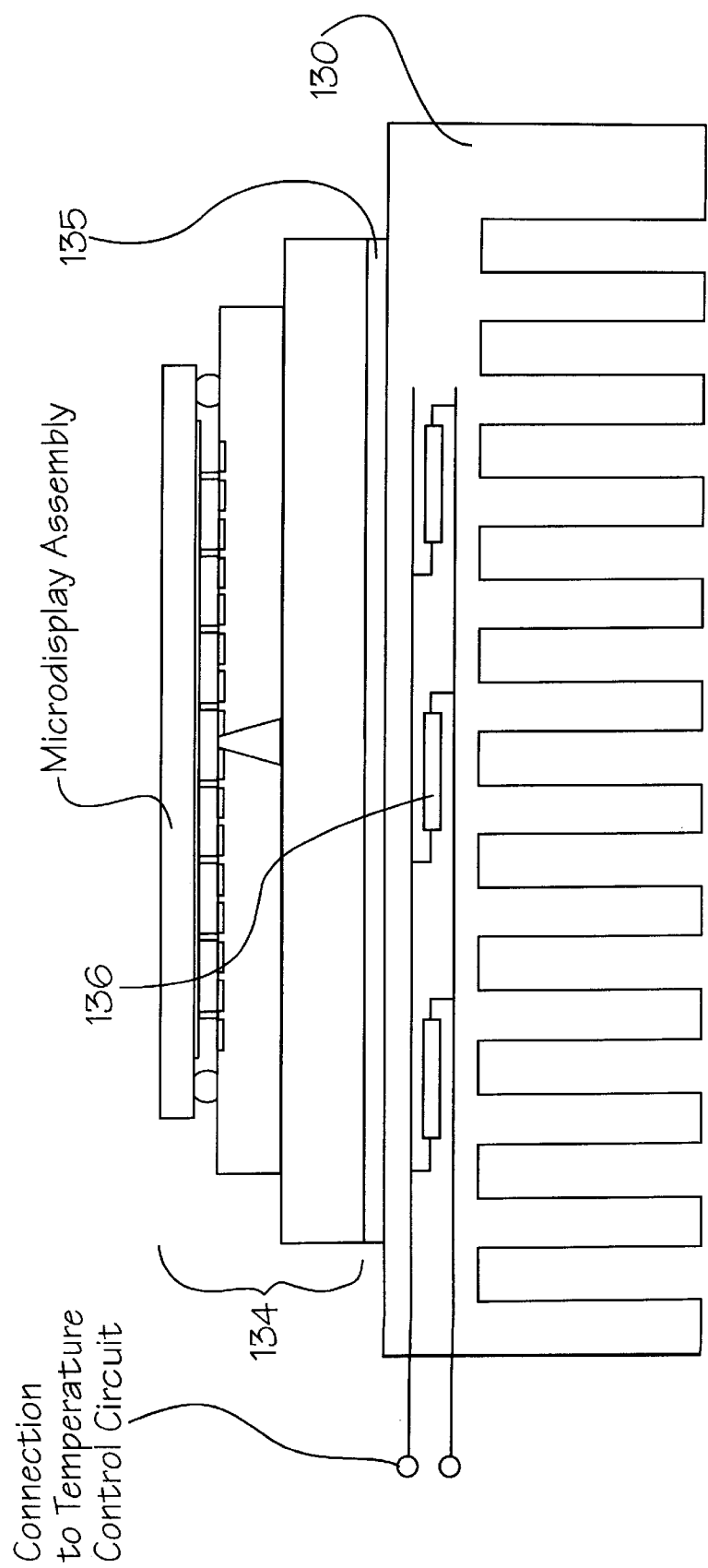
FIG. 16 is a cross-sectional schematic view of tiled microdisplay assembly with heating and temperature sensing devices embedded in a finned heat sink for dynamically controlling the temperature of the microdisplay assembly.

Referring now also to FIG. 16, an alternate embodiment has one or more devices 136 to sense (e.g., thermocouples, semiconductor diodes or resistors), and, optionally, to heat (e.g., electrical resistors). These components can be embedded into the thermal clamp 130 or into the common substrate 104. Devices 136, together with a control circuit (not shown) and an external cooling mechanism, such as convection (not shown), can dynamically control the temperature of the heat sink 130 and, thus, the tiled $\mu$D 134 as well.

Figure 17:
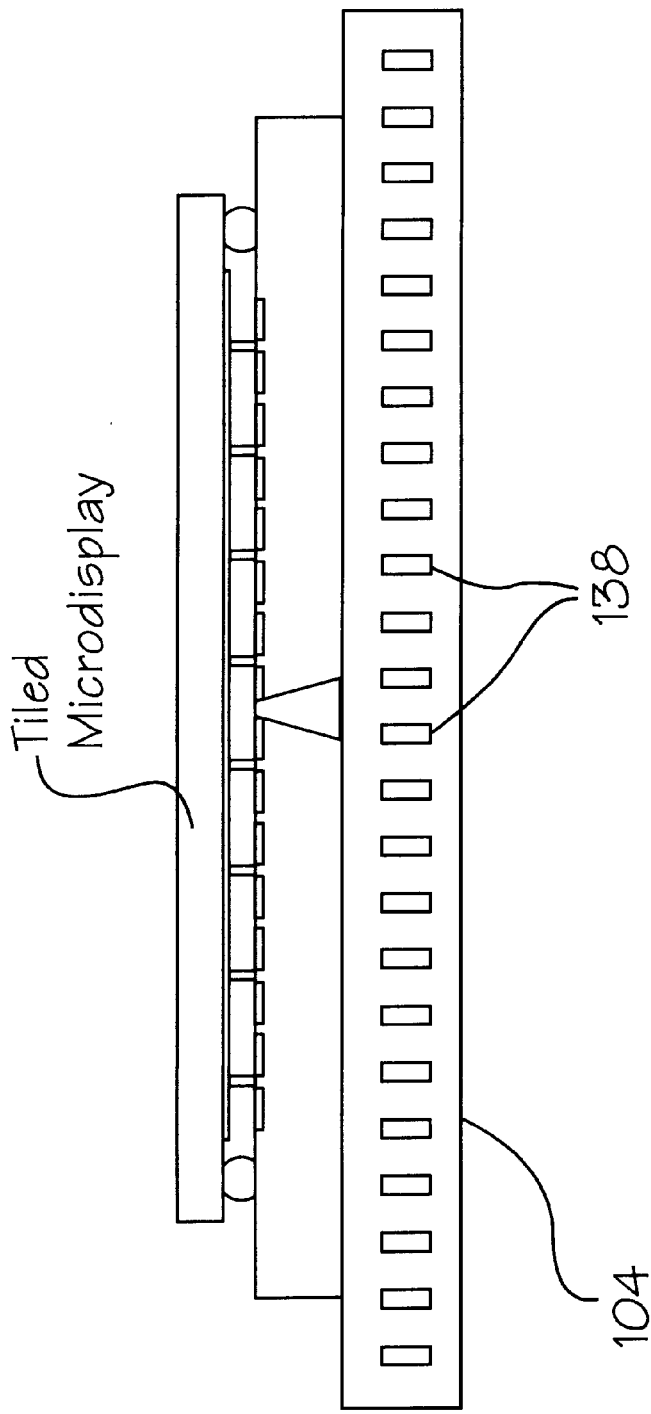
FIG. 17 is a cross-sectional schematic view of a tiled microdisplay assembly with cooling channels embedded in a common substrate.

In yet another embodiment shown in FIG. 17, liquid-cooling channels 138 are embedded into the heat sink 130 or the common substrate 104 in order to cool or dynamically control the temperature of the tiled $\mu$D assembly 134.

Figure 18:
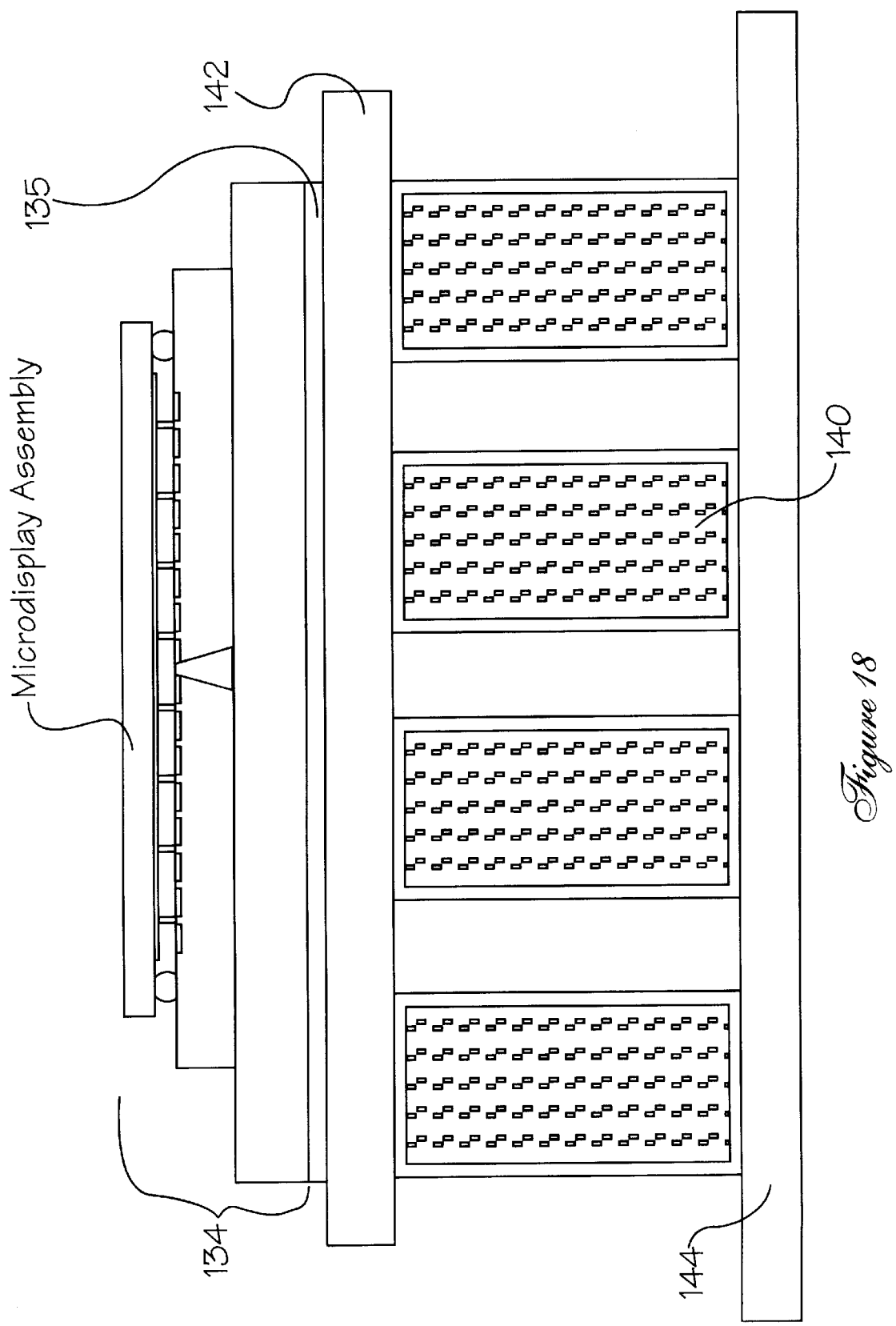
FIG. 18 is a cross-sectional schematic view of a tiled microdisplay assembly with heat pipes sandwiched between two heat spreaders one of which attached to the microdisplay assembly.

In another embodiment shown in FIG. 18, heat pipes or thermo-electric coolers 140 are built into the thermal clamp 130. This embodiment is especially useful in the production of tiled $\mu$D displays in compact enclosures. A heat spreader 142 attached to the tiled $\mu$D assembly 134 by a suitable conductive adhesive 135 conducts heat away from tiled $\mu$D assembly 134. Heat pipes 140 subsequently conduct heat from heat spreader 142 and into a heat sink 144 which may be located some distance away from heat spreader 142. The use of heat pipes 140 provides considerable thermal design flexibility.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A tiled, substantially flat, panel display comprising a plurality of microdisplays, each of said microdisplays being capable of displaying no less than a 640×480 array of pixels at a pixel pitch no greater that approximately 30 $\mu$m and occupying a space no greater than about 45×55 mm, said display having the characteristic of visually imperceptible seams between microdisplays disposed in an interior portion thereof, such that said panel display can be viewed as though it were a single, monolithic display, comprising:

a) a plurality of adjacently disposed microdisplays, said microdisplays comprising a non-transparent stack having an embedded integrated circuit, and having spaced-apart, reflective pixel-active areas upon which are formed at least a segment of an image, said segment of an image being combinable into a complete image at a view plane, said pixel-active areas being disposed at a predetermined pitch, each of said microdisplays having a predetermined thickness, disposed on a substrate adjacent and substantially parallel to said reflective pixel-active areas, said microdisplays and said substrate comprising a microdisplay assembly;

b) means defining seams disposed between adjacent microdisplays;

c) means for illuminating said image formation plane;

d) light absorbing means proximate said seams so that light directed to said seams is substantially absorbed, thereby rendering said seams substantially visually imperceptible to a viewer; and e) means for enlarging and projecting said image segments into said view plane, with substantially no visually perceptible discontinuities between said enlarged image segments.

2. The tiled, substantially flat, panel display composed of a plurality of microdisplays in accordance with claim 1, wherein said light absorbing means is applied uniformly between said pixel-inactive areas.

3. The tiled, substantially flat, panel display composed of a plurality of microdisplays in accordance with claim 1, wherein said means for projecting said image comprises means for magnifying said image.

4. The tiled, substantially flat, panel display composed of a plurality of microdisplays in accordance with claim 1, wherein said substrate has thermal and mechanical characteristics substantially matching the thermal and mechanical characteristics of said microdisplays.

5. The tiled, substantially flat, panel display composed of a plurality of microdisplays in accordance with claim 4, wherein said substrate comprises heat transfer means for transporting dissipated heat from said microdisplays in order to maintain substantial thermal uniformity over all of said microdisplays.

6. The tiled, substantially flat, panel display composed of a plurality of microdisplays in accordance with claim 5, wherein said heat transfer means comprises at least one from the group of heat sink, embedded microcooling channel, and heat pipe.

7. The tiled, substantially flat, panel display composed of a plurality of microdisplays in accordance with claim 1, further comprising thermal control means for regulating temperature of said microdisplay assembly.

8. The tiled, substantially flat, panel display composed of a plurality of microdisplays in accordance with claim 7, wherein said thermal control means for regulating temperature of said microdisplay assembly comprises heat generating means.

9. The tiled, substantially flat, panel display composed of a plurality of microdisplays in accordance with claim 1, wherein said substrate comprises at least one from the group of silicon and glass ceramic.

10. The tiled, substantially flat, panel display composed of a plurality of microdisplays in accordance with claim 1, wherein said substrate comprises semiconductor material having thermal and mechanical characteristics substantially matching the thermal and mechanical characteristics of said microdisplays.

11. The tiled, substantially flat, panel display composed of a plurality of microdisplays in accordance with claim 10, wherein said substrate comprises heat transfer means for transporting dissipated heat from said microdisplays in order to maintain substantial thermal uniformity over all of said microdisplays.

12. The tiled, substantially flat, panel display composed of a plurality of microdisplays in accordance with claim 11, wherein said heat transfer means comprises at least one from the group of heat sink, embedded microcooling channel, and heat pipe.

13. The tiled, substantially flat, display panel composed of a plurality of microdisplays in accordance with claim 12, further comprising a light shield disposed in said seams for blocking light from entering said integrated circuits.

14. The tiled, substantially flat, panel display composed of a plurality of microdisplays in accordance with claim 11, wherein said integrated circuit comprises a CMOS structure.

15. The tiled, substantially flat, panel display composed of a plurality of microdisplays in accordance with claim 10, wherein said substrate comprises an integrated circuit.

16. The tiled, substantially flat, panel display composed of a plurality of microdisplays in accordance with claim 10, wherein said semiconductor comprises at least one from the group of silicon and gallium arsenide.

17. The tiled, substantially flat, panel display composed of a plurality of microdisplays in accordance with claim 16, wherein said common cover plate comprises an anti-reflective coating.

18. The tiled, substantially flat, panel display composed of a plurality of microdisplays in accordance with claim 1, further comprising a common cover plate disposed adjacent and substantially parallel to said microdisplays.

19. The tiled, substantially flat, panel display composed of a plurality of microdisplays in accordance with claim 18, wherein said common cover plate comprises at least one electrically conductive layer.

20. The tiled, substantially flat, panel display composed of a plurality of microdisplays in accordance with claim 19, further comprising a plurality of spacers for offsetting said common cover plate relative to said substrate for providing a predetermined space therebetween.

21. The tiled, substantially flat, panel display composed of a plurality of microdisplays in accordance with claim 20, further comprising sealing means disposed between said common cover plate and said substrate.

22. The tiled, substantially flat, panel display composed of a plurality of microdisplays in accordance with claim 21, further comprising liquid crystal material disposed in said predetermined space.

23. The tiled, substantially flat, panel display composed of a plurality of microdisplays in accordance with claim 1, wherein for special color, each of said pixel-active areas comprises a primary color element.

24. The tiled, substantially flat, panel display composed of a plurality of microdisplays in accordance with claim 1, further comprising at least one polarizing layer.

25. The tiled, substantially flat, panel display composed of a plurality of microdisplays in accordance with claim 1, further comprising a passivation layer disposed adjacent said at least one image formation plane.

26. The tiled, substantially flat, panel display composed of a plurality of microdisplays in accordance with claim 1, further comprising a liquid crystal aligning layer proximate said liquid crystal material for orienting the liquid crystal molecules thereof.

27. The tiled, substantially flat, panel display composed of a plurality of microdisplays in accordance with claim 26, further comprising a passivation layer disposed adjacent said at least one image formation plane.

28. The tiled, substantially flat, panel display composed of a plurality of microdisplays in accordance with claim 1, wherein at least one of said plurality of microdisplays comprises a reflective liquid crystal microdisplay.

29. The tiled, substantially flat, panel display composed of a plurality of microdisplays in accordance with claim 1, wherein at least one of said plurality of microdisplays comprises a vacuum field emissive microdisplay.

30. The tiled, substantially flat, panel display composed of a plurality of microdisplays in accordance with claim 1, wherein at least one of said plurality of microdisplays comprises a light emissive microdisplay.

31. The tiled, substantially flat, panel display composed of a plurality of microdisplays in accordance with claim 1, wherein at least one of said plurality of microdisplays comprises a micromirror display.

32. A tiled, substantially flat, panel display comprising a plurality of microdisplay tiles, each of said microdisplays being capable of displaying no less than a 640×480 array of pixels at a pixel pitch no greater that approximately 30 $\mu$m and occupying a space no greater than about 45×55 mm, said display having the characteristic of a visually imperceptible seam, such that said panel display can be viewed as though it were a single, monolithic display, comprising:

a) means defining an image viewing plane;

b) a plurality of microdisplay tiles each having a reflective image formation plane upon which is formed at least a segment of an image, said segment of an image being combinable into a complete image at said image viewing plane, said microdisplay tiles being disposed in a plane substantially parallel to said image formation plane;

c) means for enlarging and protecting said image segments into said viewing plane, thereby forming said complete image having no visually perceptible discontinuities between said enlarged image segments;

d) means defining a seam disposed between adjacently disposed microdisplay tiles; and e) masking means disposed proximate said seam for blocking light directed from said seam towards a viewer of said display, thereby making said seam substantially visually imperceptible to said viewer.

33. The tiled, substantially flat, panel display composed of a plurality of microdisplays in accordance with claim 32, further comprising light-transferring means disposed adjacent said image formation plane.

34. The tiled, substantially flat, panel display composed of a plurality of microdisplays in accordance with claim 33, further comprising a plurality of focusing devices for coupling light into said image formation plane.

* * * * *